United States Patent
Troje

Patent Number: 5,115,266
Date of Patent: May 19, 1992

[54] OPTICAL SYSTEM FOR RECORDING OR PROJECTING A PANORAMIC IMAGE

[76] Inventor: Gerald J. Troje, 69-21 F 186 La., Fresh Meadows, N.Y. 11365

[21] Appl. No.: 683,691

[22] Filed: Apr. 11, 1991

Related U.S. Application Data

[63] Continuation-in-part of Ser. No. 433,283, Nov. 8, 1989, abandoned.

[51] Int. Cl.⁵ ............................................. G03B 37/00
[52] U.S. Cl. ......................................... 354/95; 354/81
[58] Field of Search .......................... 354/81, 95, 293; 358/109

[56] References Cited

U.S. PATENT DOCUMENTS

| | | | |
|---|---|---|---|
| 2,430,595 | 11/1947 | Young | 354/95 |
| 3,073,210 | 1/1963 | Packard | 354/95 |

*Primary Examiner*—Michael L. Gellner
*Attorney, Agent, or Firm*—Burns, Doane, Swecker & Mathis

[57] ABSTRACT

An optical system for recording or projecting a panoramic image which includes a flat transparent member, a mirror, a stem and a spherical body. The mirror is spaced from the transparent member in an axial direction, the mirror member having a reflecting surface facing the transparent member. The stem extends between and connects the transparent member and the mirror together. The spherical body has a reflecting surface spaced from the mirror in the axial direction. The reflecting surface of the spherical body is oriented with respect to the reflecting surface of the mirror such that light rays are reflected therebetween, the reflecting surface of the mirror being oriented with respect to the transparent member such that the light rays are also reflected therebetween. The optical system can be used for recording or projecting a panoramic image. The camera lens has a curvature closely matching the curvature of the reflecting surface of the spherical body. Film recorded by the camera can be used in a projector to project a distortion free 360° panoramic image on a cylindrical screen.

23 Claims, 1 Drawing Sheet

OPTICAL SYSTEM FOR RECORDING OR PROJECTING A PANORAMIC IMAGE

This application is a continuation-in-part of Ser. No. 07/433,283 filed on Nov. 8, 1989 now abandoned.

BACKGROUND OF THE INVENTION

The present invention relates to an optical system for recording or projecting a panoramic image. In particular, the system can be used with a movie projector to project a 360° panoramic image or the system can be used with a camera such as a VCR, a professional movie camera or even a camera for taking still pictures.

U.S. Pat. No. 3,822,936 discloses an optical system for panoramic projection which is capable of producing a 360° image on a circular screen surrounding an audience. In particular, this patent discloses a system of frusto-conical, optically-reflective surfaces arranged in adjustable relationship to enable a projector located above and out of the area of the audience to display a panoramic view on a 360° screen surrounding the audience. One embodiment disclosed in this patent includes a motion picture projector disposed above a ceiling and a circular projection screen with an interior reflective coating located in the space below the ceiling and positioned concentrically with respect to an aperture in the ceiling through which the images are projected. An optical prism is located in front of the projector and over the aperture, the prism having an interior optically reflective surface for reflecting the projected image in alignment with the central axis of the aperture. Three frusto-conical elements are provided for reflecting the projected image onto the circular screen. The first element is conical in shape and has an exterior optically reflective surface for reflecting the projected image from the prism onto a second one of the elements. The second element has an interior optically reflective surface for reflecting the projected image onto the third element. The third element has an exterior optically reflective surface for reflecting the projected image onto the circular screen.

U.S. Pat. No. 3,846,809 discloses a system of frusto-conical and hemispherical reflectors mounted on a supporting structure for attachment to the interior or exterior of a camera lens barrel to provide panoramic viewing. In particular, a reflector is slidably mounted on a slender transparent stem member which is fixed to and in perpendicular relationship to a transparent disk which is externally threaded to screw into the lens barrel of a camera. The reflector is of composite shape and includes two surfaces of revolution, a frusto-conical portion and a hemispherical portion. The surfaces of the reflector are so oriented that incoming light rays are reflected along the axis of the camera which is concentric with the axis of the surfaces of revolution. The stem does not interfere with the reflected light and a complete picture of the panorama is thereby formed on the camera film.

The prior art arrangement of U.S. Pat. No. 3,822,936 allows the projector to be hidden from view in a space above a ceiling but the projector is not portable whereas the camera used in the prior art arrangement of U.S. Pat. No. 3,846,809 cannot be hidden from view even though it is portable. Accordingly, there exists a need in the art for an optical system for recording or projecting a panoramic image which allows the camera or projector to be hidden from view and which allows the system to be portable or fixedly mounted when in use. Furthermore, there is a need in the art for a panoramic system which provides distortion free images.

SUMMARY OF THE INVENTION

An object of the present invention is to provide an optical system for recording or projecting a panoramic image. The system comprises a first member including a transparent section, a second member spaced from the first member in an axial direction, the second member having a reflecting surface facing the first member, a third member connecting the first and second members together and a fourth member having a reflecting surface spaced from the second member in the axial direction, the reflecting surface of the fourth member being oriented with respect to the reflecting surface of the second member such that light rays are reflected therebetween, and the reflecting surface of the second member being oriented with respect to the transparent section such that the light rays are also reflected therebetween.

In a preferred embodiment, the reflecting surface of the fourth member comprises a surface of revolution, the transparent section and the surface of revolution being coaxial with each other. The surface of revolution can be spherical in shape but it is possible for the surface of revolution to have other shapes since an annular zone of the reflected image is not very large. Accordingly, the surface of revolution could be frusto-conical in shape.

In the preferred embodiment, the transparent section comprises a flat transparent piece of material and the third member comprises a thin transparent rectilinearly extending stem, the stem being attached at one end thereof to the transparent section and at the opposite end thereof to the second member. In this embodiment, the reflecting surface of the second member comprises a planar surface which is parallel to planar surfaces of the transparent section. In an alternative embodiment, the third member can comprise one or more structural elements which connnect the second member to the first member such that they are axially spaced apart.

In the preferred embodiment, the fourth member comprises a partly spherically shaped hollow body having a reflective coating on an interior surface thereof forming the reflecting surface of the fourth member, the curvature of the hollow body being about 38°-40°. In this case, it is preferable that the lens of the camera have a similar curvature of about 38°-40° to prevent distortion of the recorded or projected image. That is, it is advantageous to use a camera having a lens with a curvature which matches that of the reflecting surface of the fourth member in order to record an image which when projected from a projector can be shown on a circular screen without distortion.

The optical system can include means for attaching the optical system to a ceiling of a room for either recording images with a camera or for projecting images with a projector on a circular screen in the room. Alternatively, the optical system can include means for supporting the optical system at a desired height above a support surface. In this case, the supporting means can include a plurality of rectilinearly extending transparent stems, each of which has one end thereof connected to the fourth member at a different circumferentially spaced position about the fourth member. Surprisingly, the use of such stems is not noticeable when recording or projecting the panoramic image.

In the preferred embodiment, the first member is supported by the fourth member. In particular, the reflecting surface of the fourth member can be spherical in shape, the transparent section can have two parallel planar surfaces with the transparent section being supported at an apex of the spherical surface, and the reflecting surface of the second member can be planar and parallel to the planar surfaces of the transparent section whereby light rays passing between the transparent section and the second member are reflected from a first annular zone on the reflecting surface of the second member to a second annular zone on the reflecting surface of the fourth member. Accordingly, the second member could be in the form of a flat annular ring. Alternatively, the first member could include means for supporting the transparent section on a lens barrel of a projector or a camera.

In another embodiment, the fourth member can comprise a frusto-conical reflector ring disposed coaxially with respect to the transparent section, the reflecting surface of the fourth member comprising a radially outer surface of the ring, the ring becoming larger in diameter in a direction away from the second member. In this case, the reflecting surface of the ring should form an angle in the range of about 38°–40° with a normal to the reflecting surface of the second member.

In a further embodiment, the third member can comprise a transparent body that connects the second member to the first member. For instance, the third member could comprise a transparent semispherical body. Furthermore, the second member could comprise a annular ring which advantageously allows a camera to see directly below the second member in addition to providing a panoramic view of the surroundings. The annular ring forming the second member in this case can be supported by the transparent body and the transparent section can be supported by the spherically shaped fourth member as in the earlier described embodiments.

The camera or projector can be mounted by any suitable means such as by one or more bracing members supported by the spherically shaped body. Accordingly, by using the combination of the annular ring and the transparent body, the optical system of the invention allows very effective 360° surveillance with a single camera which provides an instantaneous 360° field of view without rotating the camera. Furthermore, when a transparent body is used, the fourth member can have the reflective coating forming the reflective surface on the radially outer surface of the fourth member thereby improving the recorded and projected images since the light rays do not have to pass through an additional medium as in the case of a transparent body having a reflective coating on the inner surface thereof. The transparent body could also include a reflective coating similar to that of a one-way mirror so that the optical system within the transparent body could not be observed by the human eye.

DETAILED DESCRIPTION OF THE PREFERRED EMBODIMENTS

Figure 1:
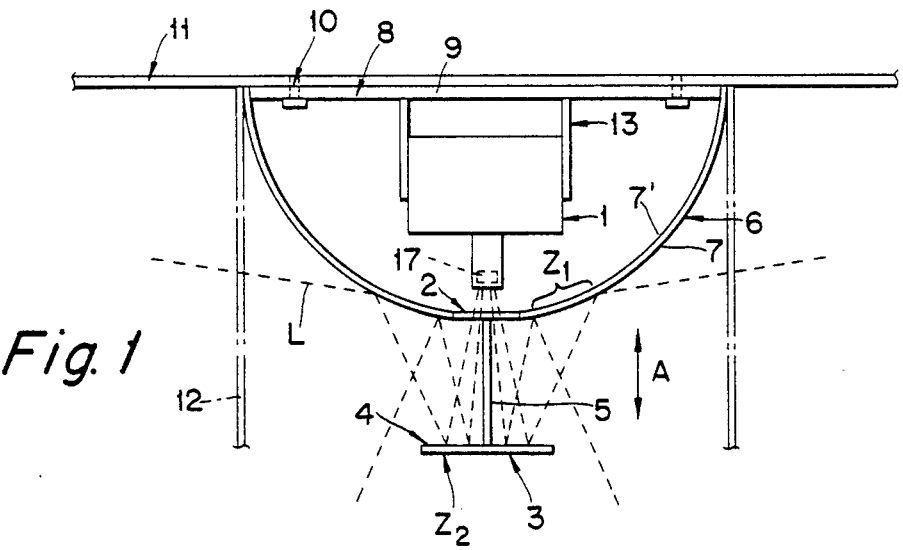
FIG. 1 is a cross-sectional view of a preferred embodiment of the invention wherein a fourth member comprises a spherically shaped hollow body.

The present invention relates to an optical system for recording or projecting a panoramic image. This system has a number of applications. For instance, the system could be used in place of single or multiple TV camera systems which are used for detection and surveillance of private or commercial establishments. The system of the present invention, however, allows the camera to cover the entire circular field of vision at all times. A particular advantage of this system is that there are no sections, breaks or distortion of the viewed image and it is not necessary to rotate the camera to obtain such complete 360° coverage. Furthermore, such coverage can be obtained with one TV monitor.

Other possible uses of the system according to the present invention include defense applications. For instance, whereas present submarines employ manually rotated periscopes with a limited field of vision, the 360° system camera of the invention allows "in the round" vision at all times while the periscope is stationary, that is, no rotation of the periscope is necessary. Other applications of the inventive system could be for tanks, aircraft and naval vessels. Such a system could also be used in space surveillance and space shuttle photography. It is anticipated that the system of the present invention may also be useful in laser technology in connection with star-wars technology.

Other possible uses for the inventive system include the fields of medicine and industry. For instance, the system could be used for viewing the interior of the human body with scopes having a limited field of vision. The 360° system of the invention could allow "in the round" coverage of interior arterial passages, intestines, etc. Industrial applications of the invention could include examination of the interior structural conditions of tubing such as large oil pipelines or tubes used in the nuclear industry, water and sewage pipelines or other similar applications. Another application could include incorporating the inventive system with robots for examining dangerous radioactive contaminated atomic plants as well as interior reactor cores.

Another application of the inventive system is in the motion picture industry. For instance, the system of the invention permits filming of panoramic images and projecting of such panoramic images on a circular screen which completely surrounds the observer. The visual effect of motion pictures is made possible by the property of persistence of vision of the human eye whereby the observer who sees a sequence of still pictures of an action receives the impression of seeing a continuous motion. Progress has been made from the early silent films with little or no camera techniques and subtleties to the present day large screen productions with stereophonic sound and camera techniques that defy the imagination. The inventive system carries such advances in motion picture technology to another level. In particular, a filmed scene can be reproduced in panoramic vision on a screen which completely surrounds the observer in a circle allowing 360° image with the observer in the middle. The peripheral vision of the human eye greatly influences the impressions formed, and observers of a panoramic picture who are located at or near the center of curvature of screen experience a depth effect forcefully created in their minds. This effect is formed both from directly viewing the main action of the picture and from the indirect side views of scenery of lesser interest. The depth effect can be greatly enhanced by synchronization of the action portrayed with stereophonic sound which can be made clearly to convey the sensation of motion in conjunction with moving objects on the pictured scene.

Figure 2:
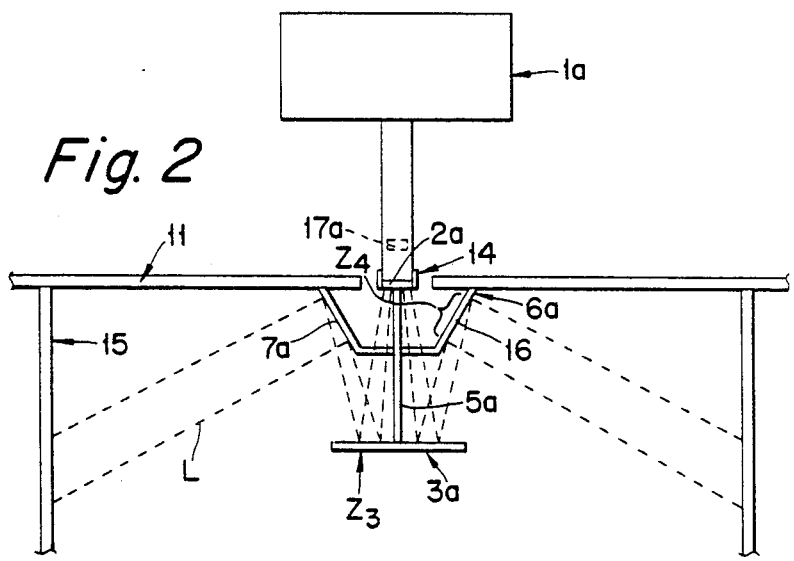
FIG. 2 is a cross-sectional view of an alternative embodiment wherein the fourth member comprises a frusto-conically shaped hollow body.

The details of a preferred optical system according to the present invention can be seen in FIGS. 1 and 2. In particular, a preferred embodiment is illustrated in FIG. 1 and an alternative embodiment is shown in FIG. 2.

In the preferred embodiment, the optical system can be used for recording or projecting a panoramic image. Accordingly, the system can be used with either a camera or a projector, both of which are designated at 1 in FIG. 1. The optical system itself includes a first member 2 which includes a transparent section. A second member 3 is spaced from the first member in an axial direction A, the second member 3 having a reflecting surface 4 facing the first member 2. A third member 5 extends between and connects the first and second members together. A fourth member 6 includes a reflecting surface 7 spaced from the second member 3 in the axial direction A, the reflecting surface 7 of the fourth member 6 being oriented with respect to the reflecting surface 4 of the second member 3 such that light rays L are reflected therebetween, the reflecting surface 4 of the second member 3 being oriented with respect to the transparent section 2 such that the light rays L are also reflected therebetween.

In the preferred embodiment, the reflecting surface of the fourth member 6 comprises a surface of revolution, the surface of revolution being spherical in shape and coaxial with the transparent section 2. The transparent section 2 can comprise a planar transparent piece of material and the reflecting surface 4 of the second member 3 can comprise a planar surface which is parallel to the planar surfaces of the transparent section 2. The third member 5 can comprise a transparent rectilinearly extending stem which is attached at one end thereof to the transparent section 2 and at the other end thereof to the second member 3.

In order to avoid distortion of the projected or recorded image, the curvature of the fourth member 6 should match that of the lens of the camera. In particular, the fourth member can comprise a partly spherically shaped hollow body such as a sphere which has been cut in half. In this case, it is advantageous to provide a reflective coating on an interior surface 7' of the hollow body if the hollow body is of transparent material. In this case, the reflective coating forms the reflecting surface 7' of the fourth member 6. Alternatively, the reflective coating can be provided on the outer surface of the fourth member 6. It is also advantageous to use a hollow body having a large diameter such as about 3 feet. The curvature of such a hollow body will be about 38° to 40° no matter what diameter is chosen. It has been found, however, that better images are obtained when the fourth member has a large diameter. Accordingly, while the diameter of the fourth member is not critical, diameters of 36 inches and above are considered preferable for purposes of obtaining better images. Images without distortion can be obtained if the curvature of the camera lens matches the 38°-40° curvature of the spherical reflecting surface of the fourth member. Similar results may be obtainable if the curvature of the lens of the camera matches the angle that the reflecting surface of the fourth member forms with a normal to the reflecting surface of the second member.

With the above arrangement, the fourth member can be mounted on a ceiling or supported by some other means above a lower support surface. In particular, the fourth member 6 can include means 8 such as a support member 9 and fasteners 10 for attaching the optical system to a ceiling 11 of a room. Of course, any suitable mounting means can be used for supporting the optical system from a ceiling.

Alternatively, means 12 can be provided for supporting the optical system at a desired height above a lower support surface. In this case, the supporting means 12 can comprise a plurality of thin rectilinearly extending transparent stems, the stems having one end thereof connected to the fourth member 6 at different circumferentially spaced-apart positions about the fourth member. It has been found that the use of these stems 12 does not interfere with the image recorded or projected, that is, the stems are not visible in the projected or recorded image.

The camera or projector 1 can be supported within the fourth member 6 by suitable means 13 such as support braces. In the case of a professional movie projector, however, the projector could be located in a space above a ceiling as shown in FIG. 2.

The first member 2 can be supported by the fourth member 6. For instance, the transparent section 2 can be supported at an apex of the spherical surface, or the first member 2a can include means 14 for supporting the transparent section 2a on a lens barrel of a projector or a camera 1a as illustrated in FIG. 2. In the case where the transparent section 2a is mounted on the barrel of a camera or projector 1a, the means 14 can comprise an internally threaded piece for attaching the transparent section to the outer periphery of the lens barrel or the piece can be externally threaded for attaching the transparent section to an internally threaded part of the lens barrel.

In the case where the equipment 1a is a camera, the image to be recorded is transmitted via light rays L which travel from the scene being recorded to an annular zone $Z_1$ on the fourth member 6, the light rays L are then reflected to an annular zone $Z_2$ on the second member 3 and the light rays L are reflected through the transparent section 2 into the camera 1. By matching the curvature of the fourth member 4 to that of a lens 17 in the camera, it is possible to record a panoramic image which can be shown on a circular screen without distortion. Typically, the recorded image will include a dark spot at the center of each frame of the film. This dark spot represents the field of view directly below the camera and covers an area when projected in which the audience views the panoramic image which is projected on a circular screen surrounding the audience.

In the case where the equipment 1a is a projector, the projected image passes through the transparent section 2a via light rays L and strikes the second member 3a in an annular zone $Z_3$, the light rays L are then reflected and strike the fourth member 6a in an annular zone $Z_4$ and then the light rays L are reflected and strike a circular viewing screen 15 to display a panoramic image which completely surrounds a viewer located at a position radially inside of the screen 15. The lower part of the screen can be curved inwardly toward the center of the viewing area.

FIG. 2 shows how the system of the invention can be used to project a panoramic image on the circular screen 15. In this case, the second member 6a can comprise the spherically shaped body shown in FIG. 1 or a frusto-conically shaped ring 16 as shown in FIG. 2. In this case, the ring 16 can be disposed coaxially with respect to the transparent section 2a and the reflecting surface 7a of the fourth member 6a can comprise a radially outer surface of the ring 16 or a radially inner surface of the ring 16. For example, the ring could be formed of glass or other transparent material and a reflective coating could be provided on the inside surface to form the reflective surface 7a. As shown in FIG. 2, the ring 16 can have a diameter which increases in a direction away from the second member 3a. FIG. 2 also shows how the projector or camera 1a could be mounted in a space above the ceiling 11.

Figure 3:
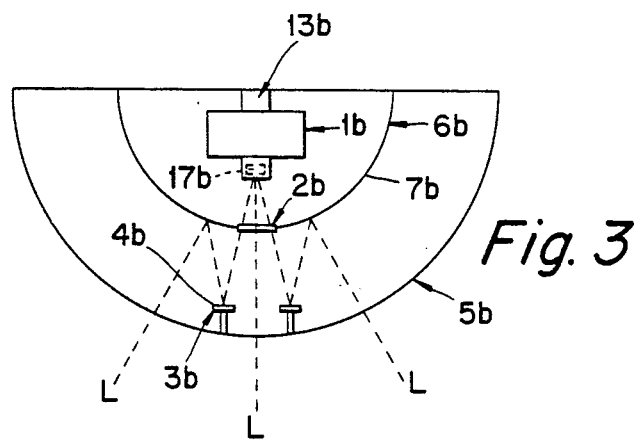
FIG. 3 is a cross-sectional view of a further embodiment wherein the third member comprises a transparent semispherical body.

In a further embodiment, the third member 5 can comprise a transparent body 5b that connects the second member to the first member. For instance, the third member can comprise a transparent semispherical body 5b as shown in FIG. 3. Furthermore, the second member 3 could comprise a annular ring 3b which allows a camera to see directly below the second member 3. The annular ring 3b forming the second member 3 in this case can be supported by the transparent body 5b and the transparent section 2b can be supported by the spherically shaped body 6b as in the earlier described embodiments.

The camera or projector 1b shown in FIG. 3 can be mounted by any suitable means 13b such as by one or more bracing members supported by the spherically shaped body 6b. Accordingly, by using the combination of the annular ring 3b and the transparent body 5b, the optical system of the invention allows very effective 360° surveillance with a single camera which provides an instantaneous 360° field of view without rotating the camera. Furthermore, when a transparent body 5b is used, the fourth member 6b can have the reflective coating forming the reflective surface 7b on the radially outer surface of the fourth member 6b thereby improving the clarity of the recorded and projected images. The transparent body 5b could also include a reflective coating such as that of a one-way mirror so that the optical system hidden within the body 5b could not be observed by the human eye.

While the invention has been described with reference to the foregoing embodiments, changes and modifications may be made thereto without departing from the spirit and scope of the appended claims. For instance, the camera/projector 1 could be mounted horizontally and one or more reflectors could be used to reflect images between the optical system of the invention and the camera/projector. Furthermore, the second member could be movably mounted with respect to the fourth member to adjust the field of view of the camera or the location of the image projected by the camera.

What is claimed is:

1. An optical system for recording a panoramic image, comprising:
   a camera having a camera lens,
   a first member including a transparent section thereof,
   a second member spaced from said first member in an axial direction, said second member having a reflecting surface facing said first member,
   a third member connecting said first and second members together, and
   a fourth member having a reflecting surface spaced from said second member in said axial direction, said reflecting surface of said fourth member being oriented with respect to said reflecting surface of said second member such that light rays are reflected therebetween, said reflecting surface of said second member being oriented with respect to said transparent section such that said light rays are also reflected therebetween, the reflecting surface of the fourth member having a curvature closely matching the curvature of the camera lens.

2. The optical system of claim 1, wherein said reflecting surface of said fourth member comprises a surface of revolution.

3. The optical system of claim 2, wherein said transparent section and said surface of revolution are coaxial with each other.

4. The optical system of claim 3, wherein said surface of revolution is frusto-conical in shape.

5. The optical system of claim 3, wherein said surface of revolution is spherical in shape.

6. The optical system of claim 3, wherein said transparent section comprises a planar transparent piece of material.

7. The optical system of claim 6, wherein said reflecting surface of said second member comprises a planar surface which is parallel to planar surfaces of the transparent section.

8. The optical system of claim 1, wherein said third member comprises a transparent rectilinearly extending stem.

9. The optical system of claim 7, wherein said stem is attached at one end thereof to said transparent section and at an opposite end thereof to said second member.

10. The optical system of claim 8, wherein said third member comprises a transparent body supporting said first member, said second member and said fourth member.

11. The optical system of claim 1, wherein said fourth member comprises a partly spherically shaped hollow body having a reflective coating on an interior surface thereof forming the reflecting surface of the fourth member, the curvature of the hollow body being about 38°–40°.

12. The optical system of claim 1, further comprising means for attaching said optical system to a ceiling of a room.

13. The optical system of claim 12, wherein said supporting means includes a plurality of rectilinearly extending transparent stems, each of which has one end thereof connected to said fourth member at a different circumferentially spaced position about said fourth member.

14. The optical system of claim 1, further comprising means for supporting said optical system at a desired height above a support surface.

15. The optical system of claim 1, wherein said first member is supported by said fourth member.

16. The optical system of claim 1, wherein said reflecting surface of said fourth member is spherical in shape, said transparent section has two parallel planar surfaces and is supported at an apex of said spherical surface, and said reflecting surface of said second member is planar and parallel to said planar surfaces of said transparent section, the light rays passing between the transparent section and the second member being reflected from a first annular zone on the reflecting surface of the second member to a second annular zone on the reflecting surface of the fourth member.

17. The optical system of claim 1, wherein said first member includes means for supporting said transparent section on a lens barrel of the camera.

18. The optical system of claim 17, wherein said third member comprises a rectilinearly extending transparent stem extending between said transparent section and said second member.

19. The optical system of claim 1, wherein said fourth member comprises an annular, axially extending reflector ring disposed coaxially with respect to said transparent section said reflecting surface of said fourth member comprising a radially outer surface of said ring, the ring having an inner diameter which increases in a direction away from the second member.

20. An optical system for recording a panoramic image, comprising:
a first member including a transparent section,
a second member spaced from said first member in an axial direction, said second member having a reflecting surface facing said first member,
a third member connecting said first and second members together,
a fourth member having a reflecting surface spaced from said second member in said axial direction, said reflecting surface of said fourth member being oriented with respect to said reflecting surface of said second member such that light rays are reflected therebetween, said reflecting surface of said second member being oriented with respect to said transparent section such that said light rays are passed therebetween, and
a camera having a camera lens oriented for receiving the light rays passed through said transparent section of said first member, light rays carrying the panoramic image striking the fourth member in an annular zone on the reflecting surface of the fourth member, the zone having a curvature closely matching a curvature of the camera lens.

21. The optical system of claim 20, wherein said transparent section of said first member comprises a flat piece of transparent material.

22. The optical system of claim 21, wherein said reflecting surface of said second member comprises a planar surface which is parallel to planar surfaces of the transparent section of the first member.

23. The optical system of claim 20, wherein said fourth member comprises a partly spherically shaped hollow body having a reflective coating on a surface thereof forming the reflecting surface of the fourth member, the curvature of the hollow body being about 38–40° and the camera lens having a curvature of about 38–40°.

* * * * *